United States Patent Office 2,963,186
Patented Dec. 6, 1960

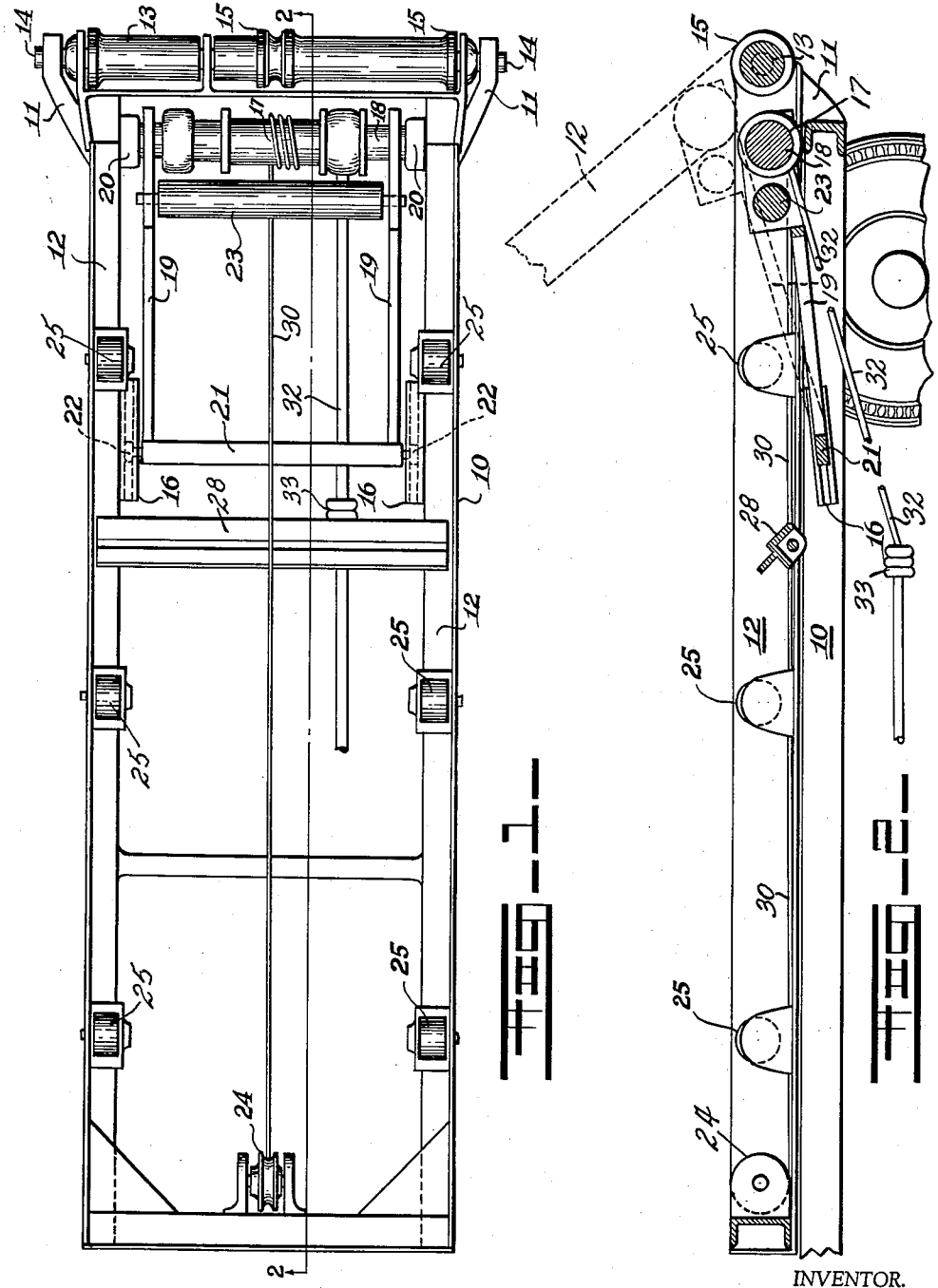

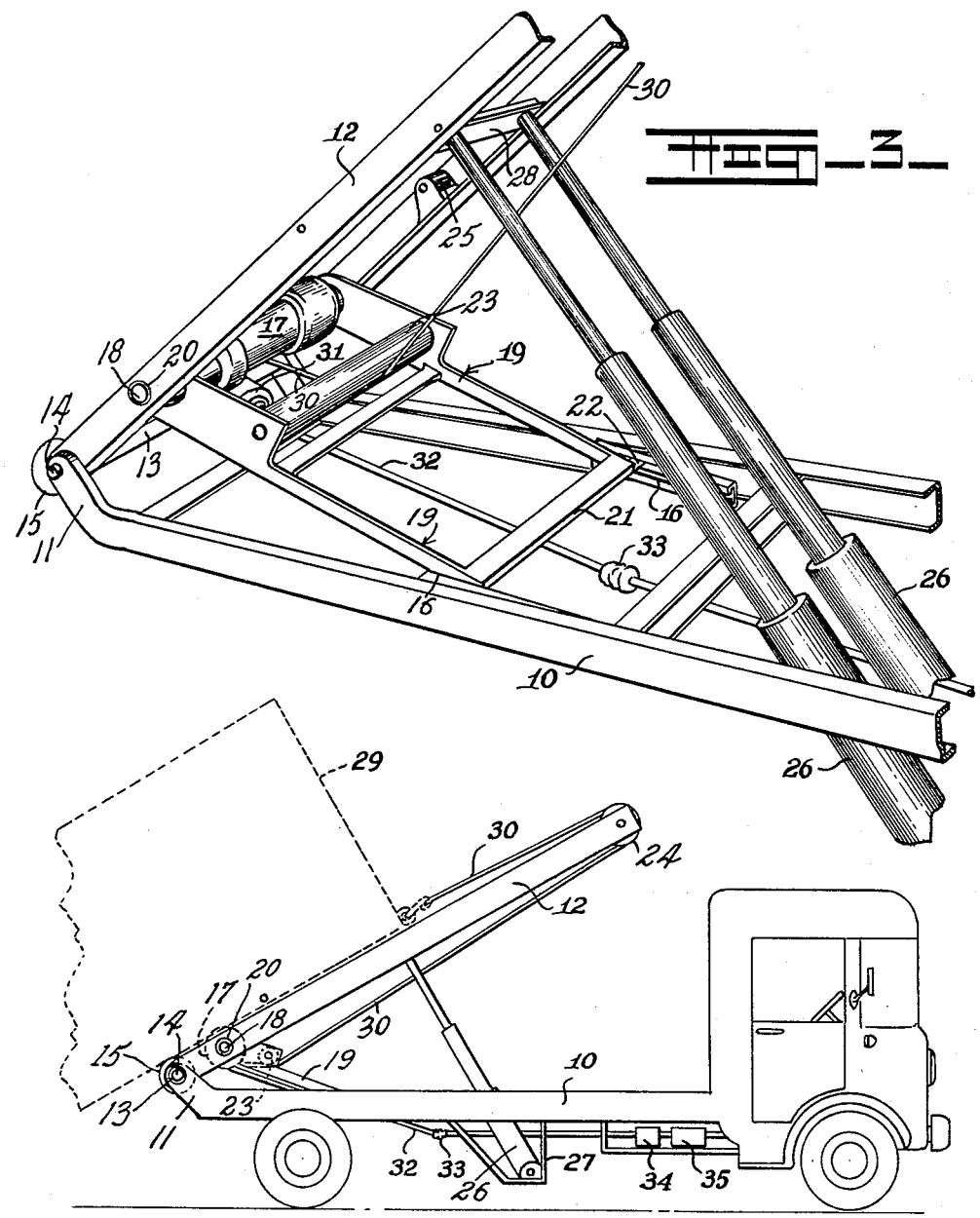

2,963,186

WINCH MOUNTING FOR TILTABLE TRUCK BEDS

Loren E. Beck, Triangle, Va., and James A. Wanamaker, Youngstown, Ohio, assignors, by direct and mesne assignments, to Trevor E. Evans, Youngstown, Ohio Filed Oct. 3, 1957, Ser. No. 688,023

4 Claims. (Cl. 214—505)

This invention relates to a truck and more particularly to a truck having a bed arranged for tiltable relation thereto such as may be adapted to removably receive a container body.

The principal object of the invention is the provision of a winch mounted on a truck having a tiltable bed arranged to impart movement to a cable reeved over pulleys on said bed for moving a container or body on the same and wherein the winch is mounted for rotational motion relative to the truck and the tiltable bed thereof.

A further object of the invention is the provision of a winch mounting for a truck having a tiltable bed and wherein said winch mounting moves relative to the tiltable bed so as to slack off and tighten up a cable controlled by said winch.

A still further object of the invention is the provision of a truck frame and tiltable bed frame pivoted thereto and incorporating a winch mounting frame therebetween movable with said bed frame for controlling the position of a cable secured to a winch mounted on said winch frame.

A still further object of the invention is the provision of a vehicle frame having a secondary frame pivoted thereto at one end thereof and adapted to support a container body thereon in movable relation thereto and incorporating movable means for supporting a winch for moving said movable body.

The vehicle frame, tiltable bed frame and winch frame disclosed herein comprises a novel means of mounting a winch on a vehicle body for effective use in moving objects onto or off of the tiltable bed frame. In such devices heretofore known in the art, the relative positioning of the tiltable frame to the vehicle frame and the mounting of the winch on either of said frames presented a problem of necessarily slacking off the winch and cable controlled thereby at such time as the tiltable frame was moved in one direction and of tightening up the winch and cable when the tiltable bed frame was moved in the opposite direction. Failure to make such adjustments of the winch frequently resulted in breaking of the motivating cable used for moving articles such as trash container bodies onto and off of the tiltable bed frame.

The present invention discloses a winch frame pivoted at one end to the tiltable frame and slidably engaged at its other end on the vehicle frame and mounting the winch adjacent the end pivoted to the tiltable bed frame. A winch mounted on the winch frame is automatically turned in a rotary movement insufficient to compensate for the necessary changes in the length of a cable secured to the winch when the tiltable bed frame is moved relative to the vehicle frame.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a top plan view of the vehicle frame and tiltable bed frame thereon and winch mounting frame connected thereto.

Figure 2 is a vertical section taken on line 2—2 of Figure 1.

Figure 3 is a perspective view of the vehicle frame, tiltable bed frame and winch frame in elevated position.

Figure 4 is a perspective view of a vehicle illustrating the vehicle frame, tiltable bed frame, winch frame, and broken lines illustrate a container body disposed on the tiltable bed frame.

By referring to the drawings and Figures 1 and 2 in particular it will be seen that a truck frame 10 is provided at one end thereof with offset extensions 11—11 to which a tiltable bed frame 12 is pivoted as by means of an elongated roller 13 having shafts 14—14 on its opposite ends. The roller 13 has raised collars 15 thereabout, the peripheral edges of which extend above and beyond the end of the tiltable bed frame 12, as best shown in Figure 2 of the drawings.

The bed frame 12 is adapted to rest horizontally on the upper surface of the truck frame 10 and means hereinafter described is provided for tilting the bed frame 12 with respect to the truck frame 10.

The truck frame 10 is provided with a pair of oppositely disposed inturned channels 16—16 inwardly from the rear end thereof (the right end in Figures 1 and 2 and the left end in Figures 3 and 4). A winch frame 19 is pivoted at one of its ends to the bed frame 12 by means of pivot members 18 secured to the winch frame 19 and journalled in bearings 20—20 on the bed frame 12. A winch 17 is mounted on the winch frame 19 between the pivot members 18—18 and the winch 17 in secured to the winch frame 19 so that when the winch frame 19 moves relative to the bed frame 12 and the truck frame 10, the winch 17 also moves. The opposite end of the winch frame 19 has an interconnecting frame member 21 with projecting rollers 22—22 thereon engaged in the oppositely disposed inturned channels 16—16 on the truck frame 10.

It will be seen that the pivot members 18 are spaced inwardly of the bed frame 12 with respect to the shaft 14 which pivots the frame 12 to the truck frame 10, so that motion of the bed frame 12, in an arcuate path based on the shaft 14, causes one end of the winch frame 19 to move in an arcuate path based on the pivot members 18 and therefore partially rotates the winch 17.

The winch frame 19 is provided with a transversely positioned roller 23 adjacent the winch 17 so that a cable 30 such as illustrated in Figure 4 of the drawings, secured to and wound upon the winch 17 may be reeved under the roller 23 and extended beneath the bed frame 12 to a sheave 24 adjacent the opposite end thereof and then backwardly along the upper surface of the bed frame 12 to a point enabling it to be connected as by means of a hook to a container or container-like body 29 which is adapted to be carried on the bed frame 12. The roller 23 is positioned so that the cable 30 will pass thereinunder with the relative positions of the winch 17 and the roller 23 changing as the bed frame 12 is tilted upwardly.

In order that the container or container-like body 29 carried on the bed frame 12 may be rolled on and off the same when the bed frame 21 is tilted, a plurality of secondary rollers 25—25 are positioned on the bed frame 12.

By referring to Figures 3 and 4 of the drawings it will be seen that hydraulic piston and cylinder assemblies 26—26 are provided on the truck frame 10, pivoted to a support bracket 27 thereon and secured at their outermost ends to a cross member 28 pivotally mounted on the bed frame 12. Those skilled in the art will recognize that suitable hydraulic pump and power take-off as known in the art may be used to energize the hydraulic piston and cylinder assemblies 26 so that the bed frame 12 may be tilted upwardly with respect to the truck frame 10 thereby facilitating the loading and/or unloading of a container or container-like body 29. In Figure 4 of the drawings a broken line representation of such a container or body 29 is illustrated.

It will be seen that the winch frame 19 supports the winch 17 in fixed relation thereto at all times, while the winch frame 19 is movable in an arc based on the axis of the pivot members 18, thus, when the bed frame 12 is horizontal, as shown in Figure 2 of the drawings, the winch frame 19 is substantially horizontal and the winch 17 secured thereto is in one position.

In use the cable 30 which is secured to the winch 17 and wound thereabout extends outwardly and under the roller 23, then around the roller 24 on the bed frame 12 and is engaged upon the container or body 29. Movement of the bed frame 12 moves the same relative to the winch 17, causes the cable 30 to be tightened slightly thereon as the bed frame is elevated, and conversely, to be slightly loosened as the bed frame 12 is lowered.

The changing position of the roller 23 relative to the bed frame 12 also contributes to the action of the cable 30 just described.

Those skilled in the art will recognize that in similar constructions heretofore known in the art, the winches used were mounted on the truck frame so that in operation the relatively changing positions of the bed frame and the truck frame caused a change in the effective length of the cable running from the winch and over the bed frame with the result that the cable had to be adjusted by operating the winch or become inoperative due to breakage. The present invention overcomes this difficulty and mounts the winch on the winch frame 19 while the winch 17 is held stationary with the desirable result that the cable is tightened on the winch 17 when the bed frame 12 is tilted upwardly and loosened when the bed frame 12 is tilted downwardly. As a result, the apparatus may be operated by relatively unskilled labor without danger of damaging the apparatus or the cable and whereby the over-all operation is more efficiently performed.

The invention is particularly suitable for application to vehicles servicing detachable containers in which trash, garbage, etc., is deposited in fixed locations, and which containers are picked up and transferred by the vehicle to a point of disposal and then returned.

The principal point of novelty in the present invention is the arrangement of the winch 17 on the winch frame 19, the pivotal mounting of the winch frame 19 on the bed frame 12 and its sliding engagement with the truck frame 10 whereby a desirable useful motion is imparted to the winch for the indicated purpose and relative to the tilting motion of the bed frame 12, as aforesaid.

It will occur to those skilled in the art that the winch 17 may be driven by any suitable means. As illustrated in Figures 3 and 4 of the drawings, a gear box 31 driven by a propeller shaft 32 is illustrated, a universal joint 33 being interconnected in the propeller shaft so as to permit the same to bend and thereby follow the tilting motion of the winch frame 19. The opposite end of the propeller shaft 32 is preferably driven by a power take-off and gear reduction units 34 and 35, respectively, which are energized by the engine of the vehicle on which the device is installed.

It will thus be seen that the several objects of the invention have been met by the novel winch mounting for tiltable truck beds disclosed herein.

Having thus described our invention, what we claim is:

1. A winch mounting for a tiltable truck bed on a vehicle having a horizontal frame, said tiltable truck bed having one end thereof pivoted on a transverse axis to one end of said horizontal frame, means for elevating one end of said truck bed relative to said horizontal frame, a winch frame pivoted on a transverse axis to said truck bed adjacent said pivoted end thereof and the opposite free end of said winch frame being slideably engaged on said horizontal frame, a winch disposed on said pivoted end of said winch frame, a pulley on said free end of said truck bed, a cable secured to and wound on said winch and reeved over said pulley on the free end of the tiltable truck bed so that said cable is tensioned when there is upwardly tilting movement of said tiltable truck bed and loosened when there is downward tilting movement of said tiltable truck bed.

2. The winch mounting for a tiltable truck bed set forth in claim 1 and wherein said winch is secured to said winch frame on the transverse axis of the pivots securing said winch frame to said tiltable truck bed.

3. The winch mounting for a tiltable truck bed set forth in claim 1 and wherein said winch is secured to said winch frame on the transverse axis of the pivots securing said winch frame to said tiltable truck bed and wherein a transverse roller is carried by said winch frame adjacent said winch and wherein said cable is reeved under said roller.

4. The winch mounting for a tiltable truck bed set forth in claim 1 and wherein guide channels are positioned on said horizontal frame and said free end of said winch frame is engaged in said guide channels.

References Cited in the file of this patent

UNITED STATES PATENTS

| | | |
|---|---|---|
| 647,284 | Wetmore | Apr. 10, 1900 |
| 1,277,907 | Gillespie | Sept. 3, 1918 |
| 1,290,267 | McFarland | Jan. 7, 1919 |
| 1,294,173 | Rose | Feb. 11, 1919 |
| 1,332,308 | Sanderson | Mar. 2, 1920 |
| 1,396,738 | Fontaine | Nov. 15, 1921 |
| 1,537,457 | Bryan | May 12, 1925 |
| 1,620,795 | Black | Mar. 15, 1927 |
| 1,942,319 | Wright | Jan. 2, 1934 |
| 2,351,829 | Milner | Jan. 20, 1944 |
| 2,745,566 | Boufford | May 15, 1956 |